United States Patent

Wolgemuth et al.

[11] 3,715,385
[45] Feb. 6, 1973

[54] PROCESS FOR THE PREPARATION OF N-VINYL CARBAMIC ACID ESTERS

[75] Inventors: Larry G. Wolgemuth, Cherry Hill, N.J.; William H. Fritock, Aston, Pa.

[73] Assignee: Atlantic Richfied Company, New York, N.Y.

[22] Filed: Aug. 17, 1970

[21] Appl. No.: 64,594

[52] U.S. Cl. ..........................260/482 C, 252/431 R
[51] Int. Cl. ...............................................C07c 125/06
[58] Field of Search ................................260/482 C

[56] References Cited

UNITED STATES PATENTS 3,531,425   9/1970   Burk et al. .......................260/482 C

*Primary Examiner*—Henry R. Jiles
*Assistant Examiner*—Paul J. Killos
*Attorney*—John W. Behringer, Eugene L. Bernard, Martin J. Brown, James N. Dresser, W. Brown Morton, Jr., John T. Roberts, Malcolm L. Sutherland and Morton, Bernard, Brown, Roberts & Sutherland

[57] ABSTRACT

An improved process for preparing certain N-vinyl carbamic acid esters which comprises condensing at temperatures of about 95 to 150°C., acrylonitrile carbonate of the formula:

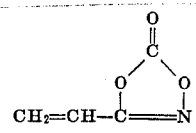

with methanol or ethanol to obtain an N-vinyl carbamic acid ester. The condensation-rearrangement reaction is effected in the presence of an inert organic solvent which boils above 100°C. at atmospheric pressure, such as bis[2-(2 methoxyethoxy)ethyl]ethane. The condensation-rearrangement reaction can be carried out in the presence of a soluble, combination metal catalyst such as a sodium alkoxytin catalyst. The reaction can also be carried out in the presence of a free radical inhibitor such as m-dinitrobenzene.

8 Claims, No Drawings

PROCESS FOR THE PREPARATION OF N-VINYL CARBAMIC ACID ESTERS

This invention concerns a process for preparing certain N-vinyl carbamic acid esters. More particularly the invention relates to an improved process for subjecting acrylonitrile carbonate, also known as ethene nitrile carbonate, to a condensation-rearrangement reaction with methanol or ethanol to produce an N-vinyl carbamic acid ester.

It is known that N-substituted carbamic acid esters, i.e., urethanes, can be prepared by condensing-rearranging a nitrile carbonate with a hydroxyl group-containing compound. In U.S. Pat. No. 3,531,242 of Burk, Kutta, and Wolgemuth, (incorporated by reference) such a process, inter alia, is disclosed. Using, for instance, propanol and ethane nitrile carbonate as illustrative reactants, the urethane-forming condensation-rearrangement reaction can be represented as follows:

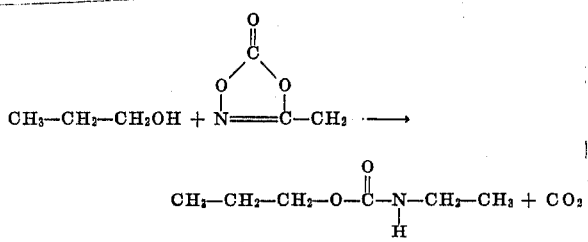

This type of reaction is disclosed in U.S. Pat No. 3,531,425 as being catalyzed by strong bases, such as tertiary amines, and, in a later-filed application of the same inventors, Ser. No. 780,878, filed Dec. 3, 1968, now U.S. Pat. No. 3,652,507 (incorporated by reference), catalyzed by a combination of (1) a first metal selected from the metals of Groups III through V of the Periodic Chart, e.g., tin, and (2) a second metal selected from the metals of Groups I and II and the iron series of Group VIII of the Periodic Chart, e.g. the alkali metal, sodium.

It is also known that the condensation-rearrangement reactions can be carried out at temperatures of about 95° to 150°C. at approximately atmospheric pressure. Under these conditions, methanol and ethanol can only be used with difficulty since they tend to evaporate before reacting. By the improved process of the present invention the use of such low boiling alcohols in the condensation-rearrangement reactions is greatly facilitated.

The improvement of this invention comprises effecting the foregoing described condensation-rearrangement reaction between acrylonitrile carbonate and methanol or ethanol in the presence of an inert organic solvent having a boiling point of at least about 100°C. The reaction temperature is about 90 to 150°C., preferably about 95 to 105°C. The product obtained is an N-vinyl carbamic acid ester of the formula:

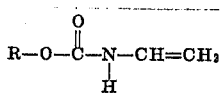

wherein R is methyl or ethyl.

In preferred embodiments of the invention the reaction is catalyzed by use of a metallic catalyst which is in solution in the reaction mixture. For example, there can be advantageously used a catalytically-effective amount of a soluble catalyst combination of a first metal of Groups III through V, and a second metal of Groups I, II and the iron series of Group VIII of the Periodic Chart as it appears on pages 392–393 of the Handbook of Chemistry and Physics, 35th Edition, Chemical Rubber Publishing Co., Cleveland, Ohio 1953. Preferably, the catalyst combination is in a ratio of about 0.2 to 4 molar equivalents of the first metal for each molar equivalent of the second metal. Most preferably, the catalyst combination is a sodium alkoxy-tin catalyst such as a product obtained from a reaction between sodium tertiary butoxide and dibutyltin oxide.

The inert organic solvent employed in the process of this invention is liquid in its normal state and has a boiling point above 100°C. at atmospheric pressure. The solvent must have the ability to dissolve the acrylonitrile carbonate reactant and it must be free of active hydrogen atoms as determined by the Zerewitinoff test so that it will not interfere with desired reactions. It is necessary that an inert organic solvent be used in the process of this invention and that it boil above 100°C. because condensation-rearrangement reactions involving acrylonitrile carbonates and alcohols are most effective at temperatures between about 90° and 150°C. These temperatures are employed at atmospheric pressure or other pressures which would permit the monhydric alcohols to boil off at the temperatures used if no solvent were present. Under these conditions, the monohydric alcohols, which boil at about 80° or less, would not be sufficiently present to effect a satisfactory condensation-rearrangement reaction with the acrylonitrile carbonates. The inert organic solvent assures sufficient presence of the alkanol to condense the acrylonitrile carbonate into the corresponding N-vinyl carbamic acid ester. Inert organic solvents having the aforementioned characteristics include aliphatic, cycloaliphatic and aromatic hydrocarbons. Suitable other solvents which can be used are oxygen-containing materials, such as ethers and polyethers not terminated by a hydroxy group. Especially preferred as a solvent is the saturated, symmetrical, aliphatic ether, bis-2-[2-(methoxyethoxy)ethyl] ether. Other solvents which can be used include the methyl or ethyl carboxylic acid esters, since resulting ester interchange reactions with the alkanol reactant would not be undesirable, dimethyformamide and dimethylsulfoxide. The amount of solvent can vary and is conveniently about 2 to 30 weights of solvent per weight of acrylonitrile carbonate, preferably about 5 to 15:1. Should there be a tendency for an azeotrope of the solvent and alcohol to form in the reaction system, this effect can be minimized by supplying the alcohol in incremental amounts to the system, e.g., not more than about 0.04 volume of alcohol per volume of solvent being present throughout the major portion of the reaction period.

The acrylonitrile carbonate reactant employed in the condensation-rearrangement reaction of this invention and its method preparation, are described in U.S. Pat. No. 3,480,595. The acrylonitrile carbonate need not be prepared separately but can be supplied to the reactant mixture in the form of a suitable precursor. For example, acrylonitrile carbonate can be provided for the reaction by introducing carbomethoxy acrylohydroxamate or carboethoxy acrylohydroxamate to the reaction mixture which latter compounds when brought to reaction temperature will decompose to yield acrylonitrile carbonate and methanol or ethanol according to the following reaction equation:

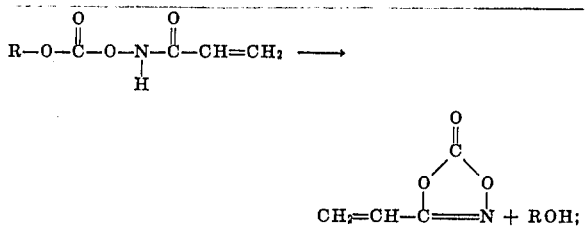

wherein R is methyl or ethyl. The decomposition of carboalkoxy acrylohydroxamates to cyclonitrile carbonates and alcohols is discussed in greater detail in U.S. Pat. No 3,531,425. Contact of the mixed metal catalysts of this invention with the hydroxamate at the temperature of the reaction of this invention can also improve the solubility of the catalyst in the reaction system.

Among the catalysts which can be employed in the process of this invention are those having two metals as disclosed in previously mentioned application Ser. No. 780,878, now U.S. Pat. No. 3,652,507. The two metals can be supplied to the catalyst combination as a compound sufficiently soluble in the reaction mixture to allow for the metals to be dissolved in the reaction mixture in catalytically-effective amounts. The metals are not suitably employed in the insoluble elemental state in the catalyst combination. Preferably, there will be present in the combination about 0.2 to 4 molar equivalents of the first metal, i.e., the Groups III–V metal, per molar equivalent of the second metal, i.e., the Groups I, II or iron series metal.

The two metals can be supplied in the form of a bimetallic alkoxo salt. Preferably, the catalyst can be a sodium alkoxytin compound such as for example a reaction product of sodium tertiary butoxide and dibutyltin oxide, or stannic chloride, or dibutyltin dilaurate, or the distannoxane obtained by placing equimolar amounts of dibutyltin oxide and dibutyltin dilaurate in benzene. The sodium alkoxytin compound can also be the reaction product of sodium isopropoxide and dibutyltin dilaurate or that of sodium methoxide and dibutyltin dilaurate. Other suitable catalyst combinations which can be employed in the process of this invention are potassium alkoxytin catalysts, sodium alkoxyaluminum catalysts, nickel alkoxyaluminum catalysts, etc. The bimetal catalyst compound can be employed in catalytically-effective amounts, say about 0.1 to 3 percent, preferably about 0.8 to 2 percent, based on the weight of the inert organic solvent.

During the process of this invention there may be a tendency to produce minor amounts of the homopolymer of acrylonitrile carbonate and to avoid this a preferred embodiment of the process of this invention includes the use in the reaction medium of a free radical polymerization inhibitor. The inhibitor can be of various types and examples of suitable inhibitors which can be used are m-dinitrobenzene, hydroquinone, t-butyl catechol, 4-methoxyphenol, triphenylmethane, benzoquinone, diphenylepicrylhydrozyl, trinitrobenzene, nitrosobenzene, and the like. The inhibitor can conveniently be employed in the reaction in a minor, effective amount, for instance, in an inhibitor to acrylonitrile carbonate weight ratio of from about 0.01 to 0.1:1, preferably, from about 0.03 to 0.06:1.

Methods of preparing N-vinyl carbamic acid esters according to the process of this invention are disclosed in the following examples.

EXAMPLE I

Bis[2-(-methoxyethoxy)ethyl]ether (8 ml.) was added to a 50 ml. round bottom flask equipped with a mechanical stirrer, reflux condenser and addition funnel. The temperature was taken up to 100°C. and 0.34 ml. of methanol was added along with 100 mg. (0.175 mmol.) of a sodium alkoxytin catalyst whose preparation is described below in Example III. The catalyst was then completely dissolved by the addition of 0.3 g. of carbomethoxy acrylohydroxamate. A vacuum was then placed on the reaction mixture to remove the methyl (N-vinyl carbamate) that formed. Because of its high boiling point, no bis[2-(2-methoxyethoxy)ethyl] ether was distilled out of solution. To illustrate that the catalyst can be reused the catalyst solution resulting from the foregoing described reaction was kept at 100°C. while 0.60 ml. of methanol and 35 mg. of m-dinitrobenzene were added to the solution. Next, 0.75 g. of acrylonitrile carbonate was slowly added from the addition funnel. After the addition was completed, methyl (N-vinylcarbamate) product was distilled out of the reaction mixture at 50°C. and 0.1 mm. pressure. A total of 0.26 g. of methyl (N-vinylcarbamate) was obtained. This corresponds to a 40 percent yield. The structure of the methyl (N-vinylcarbamate) was confirmed by infrared and Nuclear Magnetic Resonance analysis. The melting point of the product was 45–46° C. (48°C. is reported in the literature).

EXAMPLE II

To a 50 ml. round bottom flask equipped with a mechanical stirrer, reflux condenser and additional funnel, 8 ml. of bis[2-(2-methoxyethoxy)ethyl] ether was added. The temperature was taken up to 100°C. and 0.34 ml. of methanol was added along with 100 mg. of the catalyst of Example III. After heating this mixture to 100°C., 0.2 ml. of methanol was added. Next, 0.5 g. of carbomethoxy acrylohydroxamate was slowly added by use of a spatula. After all the hydroxamate was added, the reaction mixture was partially distilled to isolate the methyl (N-vinylcarbamate). A total of 0.102 g. of methyl (N-vinylcarbamate) was obtained at 31°C. and 0.04 mm. pressure which corresponds to a 29 percent yield. Melting point and infrared analyses confirmed the product to be methyl (N-vinylcarbamate).

EXAMPLE III

To prepare the catalyst of Examples I and II, a solution in dry benzene of 1 mole of dibutyltin oxide and 1 mole of dibutyltin dilaurate is refluxed and then the benzene stripped off, leaving a liquid distannoxane. This liquid is then added to a solution formed by dissolving 1 mole of sodium in t-butanol. There is formed in the reaction mixture a solid sodium alkoxo salt of the distannoxane. The solid is removed from the reaction mixture by centrifugation, washed with t-butanol and then dried.

I claim:

1. A process which comprises reacting acrylonitrile carbonate of the formula:

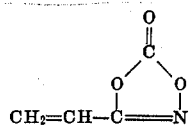

with alkanol of 1 to 2 carbon atoms to produce N-vinyl carbamic acid ester of the formula:

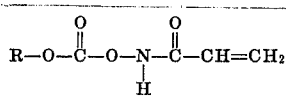

wherein R is methyl or ethyl, said reaction being effected at temperatures of about 90–150°C. and in the presence of an inert organic solvent having a boiling point of at least about 100°C., an absence of active hydrogen, and being a solvent for acrylonitrile carbonate, said reaction being conducted at a pressure which, in the absence of said solvent would result in volatilization of said alkanol from the reaction mixture.

2. The process of claim 1 wherein at least a portion of said acrylonitrile carbonate and at least a portion of said alkanol are obtained in situ by the decomposition of a carboalkoxy acrylohydroxamate of the formula

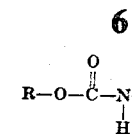

wherein R is methyl or ethyl.

3. The process of claim 1 wherein the metallic catalyst is a catalytically-effective amount of a catalyst combination of a metal selected from the metals of Groups III through V, and a metal selected from the metals of Groups I, II and the iron series of Group VIII, said metals being present in the catalyst combination in non-elemental forms sufficiently soluble in the reaction mixture to provide dissolution of catalytically-effective amounts of said metals.

4. The process of claim 3 wherein said metals are present in the catalyst combination in a ratio of about 0.2 to 4 molar equivalents of said metal of Groups III through V per molar equivalent of said metal of Groups I, II and the iron series of Group VIII.

5. The process of claim 4 wherein said catalyst is a sodium alkoxytin catalyst.

6. The process of claim 5 wherein said reaction is conducted in the presence of a free radical inhibitor.

7. The process of claim 5 wherein the solvent is bis[2-(2-methoxyethoxy)ethyl]ether.

8. The process of claim 7 wherein said reaction is conducted in the presence of a free radical inhibitor.

* * * * *

UNITED STATES PATENT OFFICE
CERTIFICATE OF CORRECTION

Patent No. 3,715,385          Dated February 6, 1973

Inventor(s) Larry G. Wolgemuth and William H. Fritock

It is certified that error appears in the above-identified patent and that said Letters Patent are hereby corrected as shown below:

Claim 1: The second formula belongs in claim 2, and the formula in claim 2 should go in place of the incorrect second formula in claim 1. The second formula in claim 1 should be:

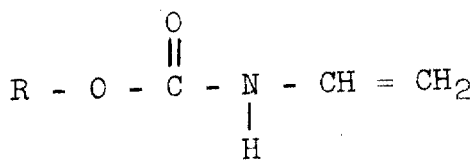

Claim 2: The formula shown belongs in claim 1 as the second formula, and the second formula in claim 1 should go in place of the incorrect formula in claim 2. The formula in claim 2 should be:

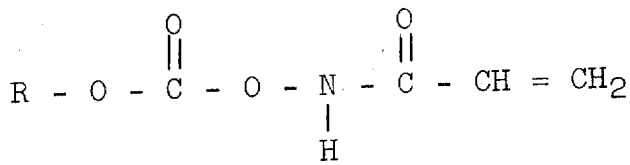

Signed and sealed this 5th day of November 1974.

(SEAL)
Attest:

McCOY M. GIBSON JR.
Attesting Officer

C. MARSHALL DANN
Commissioner of Patents